United States Patent [19]
Iwase et al.

[11] Patent Number: 5,522,778
[45] Date of Patent: Jun. 4, 1996

[54] AUTOMATIC TRANSMISSION WITH POWER TAKE-OFF UNIT

[75] Inventors: Yoshinobu Iwase, Toyokawa; Susumu Kobayashi, Anjo, both of Japan

[73] Assignee: Aisin Seiki Kabushiki Kaisha, Kariya, Japan

[21] Appl. No.: 404,269

[22] Filed: Mar. 14, 1995

[30] Foreign Application Priority Data

Mar. 18, 1994 [JP] Japan .................................. 6-074426
Feb. 16, 1995 [JP] Japan .................................. 7-053421

[51] Int. Cl.$^6$ ................................................ F16H 61/14
[52] U.S. Cl. ................... 477/62; 477/36; 477/65; 74/733.1
[58] Field of Search .................... 477/166, 168, 477/169, 36, 62, 64, 65, 86; 74/733.1; 192/3.3, 3.63

[56] References Cited

U.S. PATENT DOCUMENTS

| | | | |
|---|---|---|---|
| 4,018,316 | 4/1977 | McQuinn et al. | 477/168 |
| 4,677,879 | 7/1987 | Furusawa et al. | 477/114 |
| 5,103,951 | 4/1992 | Inui et al. | 477/36 |

*Primary Examiner*—Charles A. Marmor
*Assistant Examiner*—Sherry Estremsky
*Attorney, Agent, or Firm*—Burns, Doane, Swecker & Mathis

[57] ABSTRACT

An automatic transmission system provided with a power take-off unit, which is composed of a torque converter equipped with a lock-up clutch and a control unit that serves to set the lock-up clutch ON/OFF. With the power take-off unit in operation, the control unit sets the lock-up clutch ON only when an engine output is determined to be higher than a predetermined level, and a shift lever is set in either neutral or parking position.

2 Claims, 5 Drawing Sheets

AUTOMATIC TRANSMISSION WITH POWER TAKE-OFF UNIT

BACKGROUND OF THE INVENTION

1. Field of the Invention

The present invention relates to an automatic transmission system using a torque converter provided with a power take-off (hereinafter referred to as PTO) unit.

2. Description of Related Arts

Generally passenger cars have employed automatic transmission systems of hydraulic type using a torque converter on board. While special motor vehicles used for specific purposes, such as a dump truck and a fire truck, have employed a power take-off unit provided to the transmission system for supplying auxiliary power for the function other than running.

The conventional PTO unit provided to the automatic transmission system using a torque converter is so constructed to take power off the rear stage (behind the turbine) of the torque converter. Another type of the PTO unit that takes power off the front stage (pump) of the torque converter has also been proposed. The latter type is designed to obtain power from driving shafts connected with the torque converter pump through mechanical engagement therewith.

The above described PTO unit taking off power through the torque converter is unlikely to apply excessive load to the engine. However it is likely to lower power transmission efficiency owing to slippage of the torque converter. With the latter type of the PTO unit which takes power off the front stage of the torque converter through engagement therewith, if an engine output in idling is relatively lower than the PTO unit load, it may cause knocking or engine failure. Increasing the output to a high level will result in deteriorating fuel consumption.

SUMMARY OF THE INVENTION

It is an object of the present invention to provide an automatic transmission system with a power take-off unit which improves the fuel consumption and power transmission efficiency, and keeps the engine from excessive load.

The present invention provides an automatic transmission system with a power take-off unit for taking off auxiliary power composed of a torque converter equipped with a lock-up clutch and a control unit for setting the lock-up clutch ON/OFF which serves to set the lock-up clutch ON only when an engine output is determined to be higher than a predetermined level, and a shift lever is set in either neutral or parking position with the power take-off unit set at ON.

Other features and advantages of the invention will be apparent from the following description and the accompanying drawings.

DETAILED DESCRIPTION OF THE INVENTION

The most important feature of the present invention is characterized by a lock-up clutch and a control unit in the automatic transmission system, the latter of which is designed to set the lock-up clutch ON only when an engine output is higher than a predetermined level, and the shift lever is set in either neutral (N) or parking (P) position.

The output status of the engine may be determined by the turbine speed of the torque converter, engine speed, throttle opening of the engine, ON/OFF setting of the idle switch, and the like.

Preferably the engine output status is determined by both values of the throttle opening and the engine speed.

The engine speed and the throttle opening may refer to the output status of the engine. The above two factors serve to clarify sufficient power retained in the engine to the load.

The control unit may be in the form of, for example, ECU (Electronic Control Unit) either for speed control or engine control.

The automatic transmission according to the present invention is provided with a lock-up clutch, which improves power transmission efficiency in relation with the PTO unit when it is set at ON. While in case the lock-up clutch is set at OFF, power is transmitted to the PTO unit via the torque converter, thereby keeping the engine from excessive load.

The control unit is so constructed to set the lock-up clutch ON only when the shift lever is set in a neutral (N) or parking (P) position to supply power only to the PTO unit, and the engine output is higher than the predetermined level.

It is so constructed that the lock-up clutch is set at ON only when the engine has sufficient power to the load. As a result, it can be appropriately operated to keep the engine from excessive load and to prevent engine failure and degradation of the fuel consumption.

The present invention, thus, provides the automatic transmission with a PTO unit which improves power transmission efficiency of the engine and the fuel consumption as well as keeping the engine from excessive load with the aide of the lock-up clutch.

DESCRIPTION OF THE PREFERRED EMBODIMENTS

Embodiment 1

Figure 1:
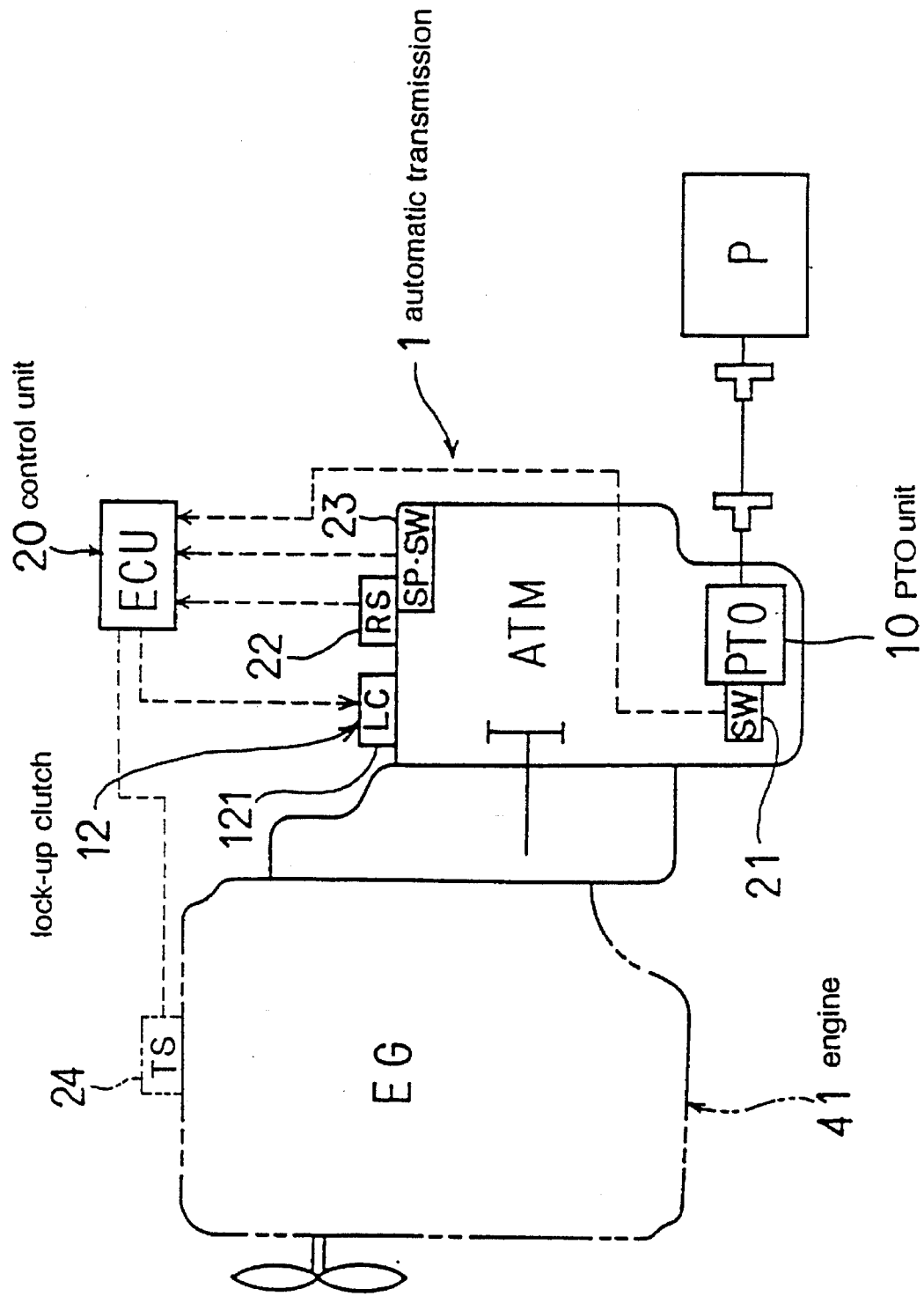
FIG. 1 system construction view of an automatic transmission system of a first embodiment.
Figure 2:
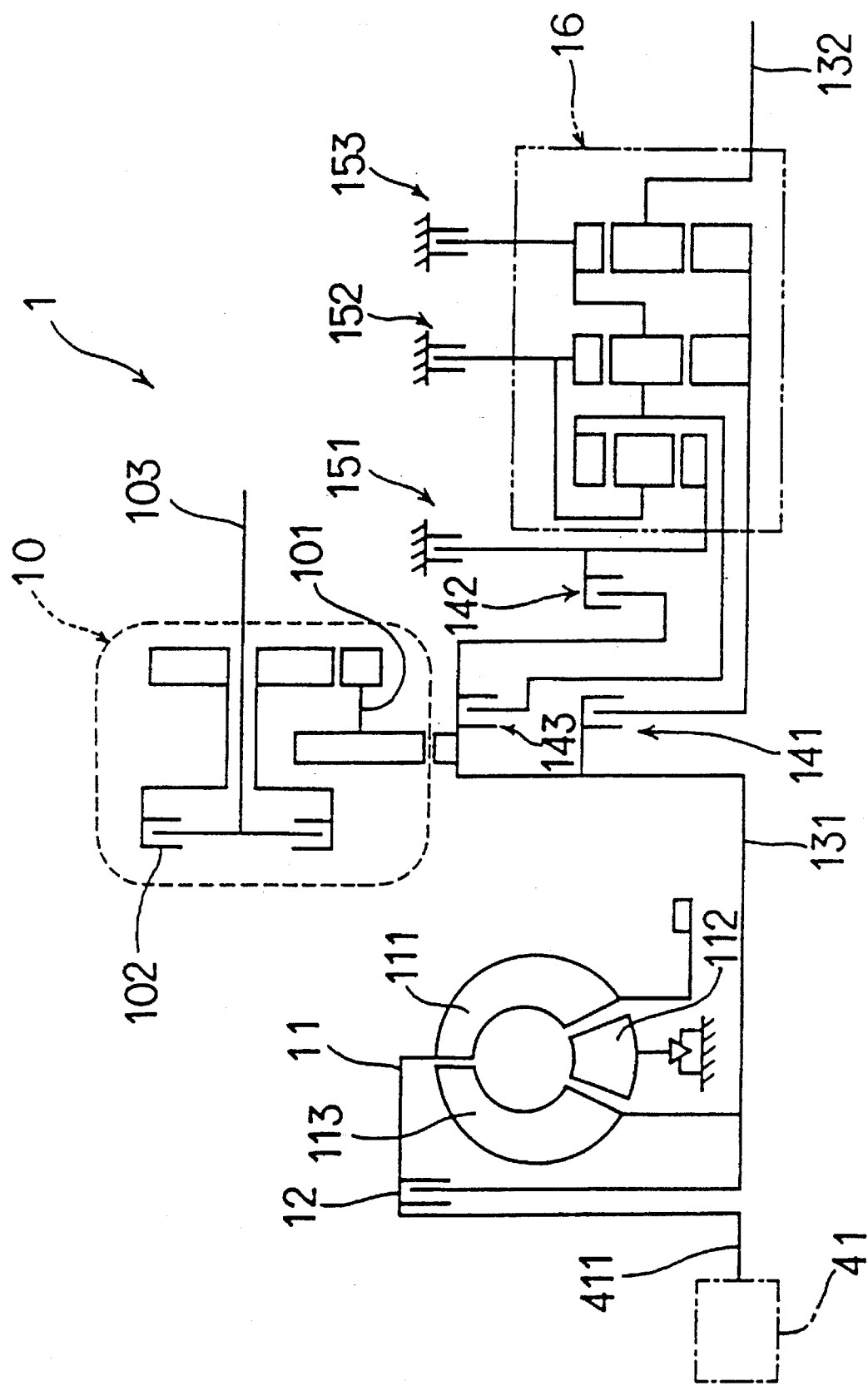
FIG. 2 is a diagrammatic view of the automatic power transmission system of the first embodiment.
Figure 3:
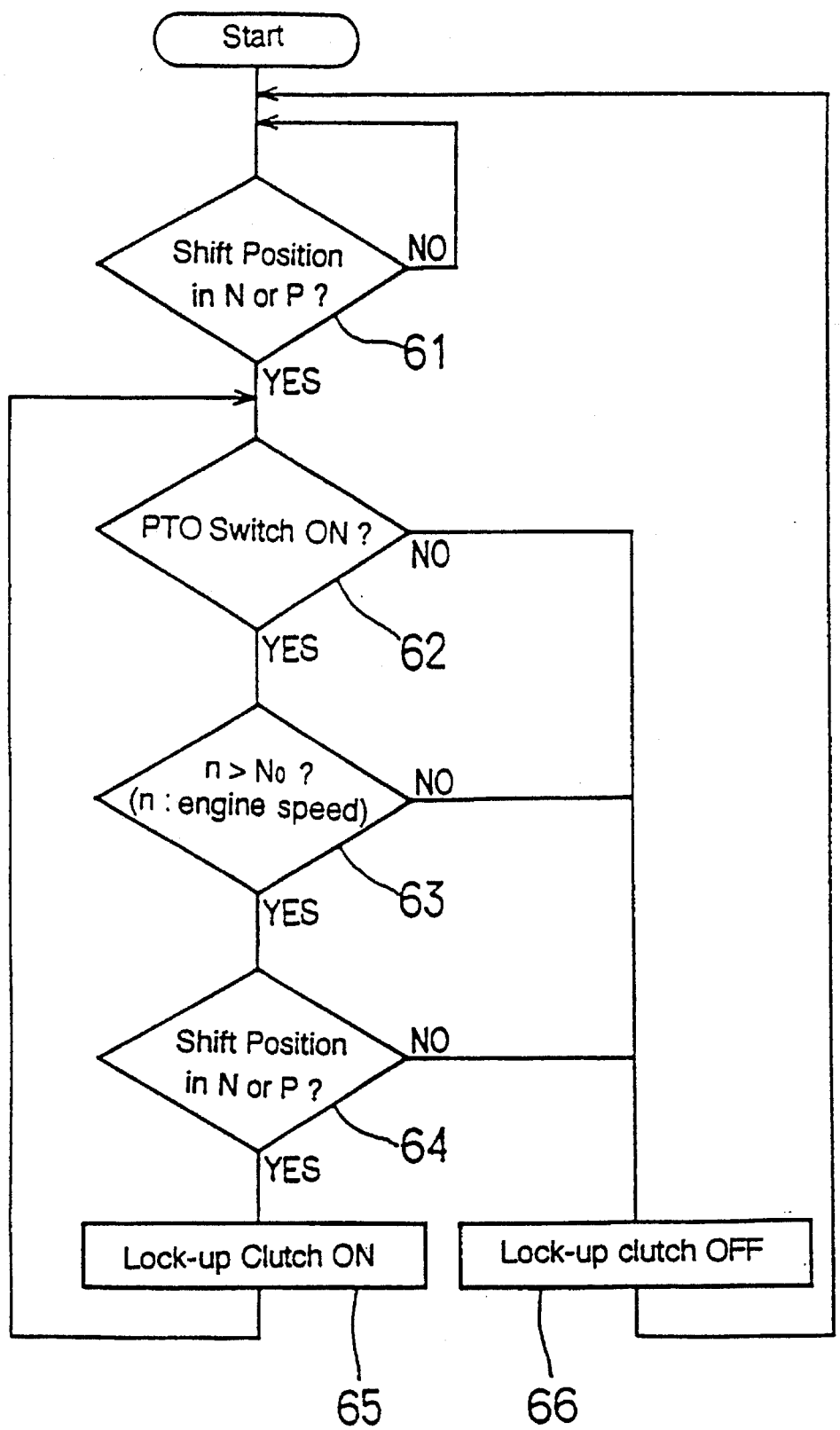
FIG. 3 is a flow chart for controlling the lock-up clutch in the automatic transmission system of the first embodiment.
Figure 4:
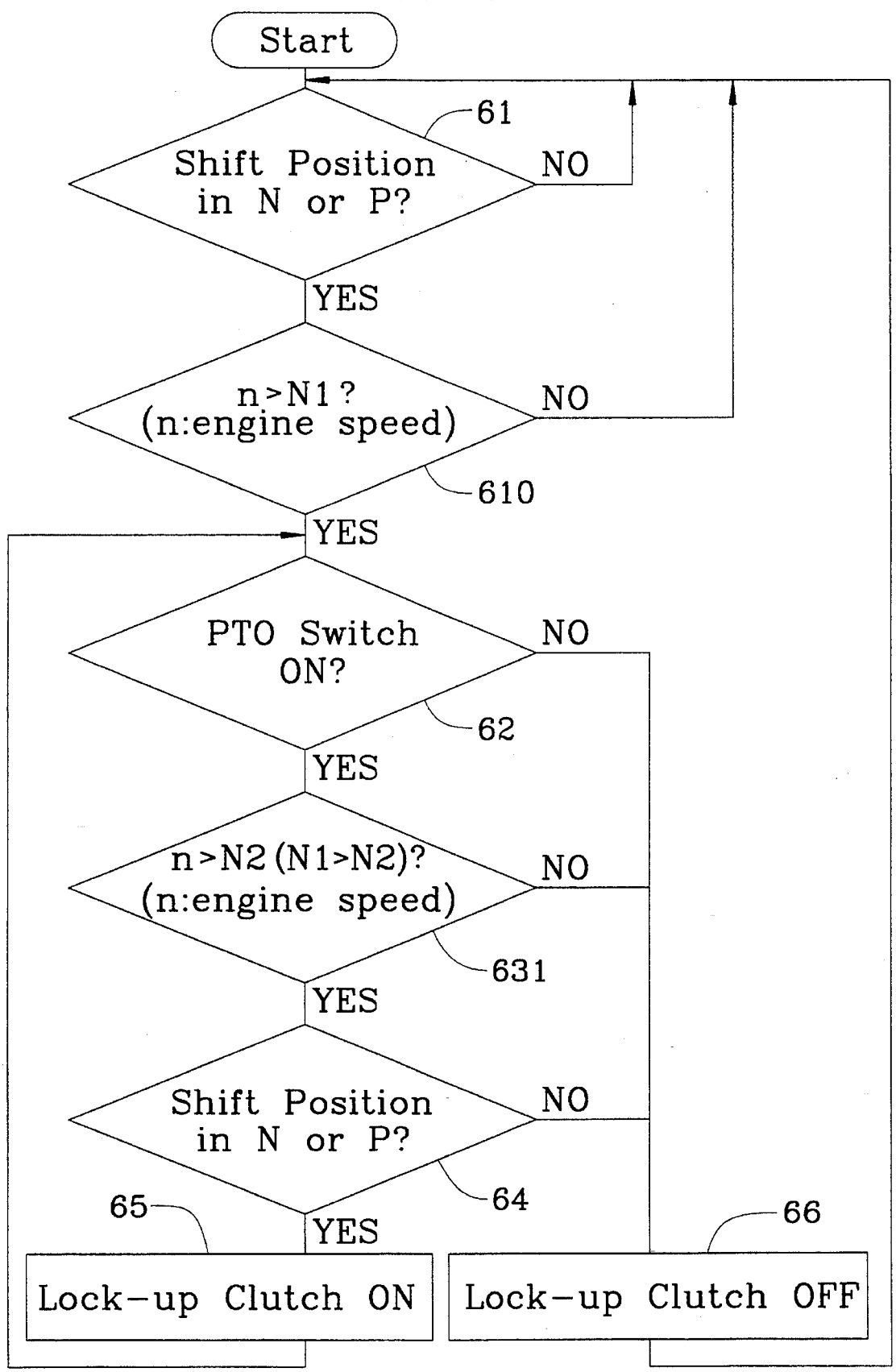
FIG. 4 is a flow chart for controlling the lock-up clutch in an automatic transmission system of a second embodiment.

Referring to FIGS. 1 to 3, the automatic transmission of this embodiment according to the present invention is hereinafter described. As FIG. 1 shows, an automatic transmission 1 is equipped with a power take-off (PTO) unit 10 for taking off auxiliary power. The automatic transmission 1 is provided with a torque converter 11 (shown in FIG. 2) with a lock-up clutch 12 and a control unit 20 for setting the lock-up clutch 12 ON/OFF.

With the PTO unit 10 operated, the control unit 20 sets the lock-up clutch 12 ON only when an engine 41 is in high output status and the shift lever is set in either neutral (N) or parking (P) position.

The automatic transmission 1 has the torque converter 11 and the lock-up clutch 12 between an output shaft 411 of the engine 41 and an automatic transmission (ATM) input shaft 131. The ATM input shaft 131 is linked with an ATM output shaft 132 via planetary gear unit 16 controlled by a group of clutches 141 to 143 and a group of brakes 151 to 153.

The ATM input shaft 131 is linked with an input shaft 101 of the PTO unit 10. The input shaft 101 serves to transmit power to a PTO output shaft 103 via a PTO clutch 102. Reference numerals 111, 112, and 113 in FIG. 2 denote a pump, stator, and turbine of the torque converter 11, respectively.

The control unit 20 is composed of a hardware formed as an ECU for transmission (shown in FIG. 1) and the control program for the lock-up clutch 12 (shown in FIG. 3).

The control unit 20 receives signals sent from a PTO switch 21 for setting the PTO clutch 102 (FIG. 2) at ON/OFF, a rotational sensor 22 in the engine 41, and a shift position switch 23 to actuate a drive coil 121 of the lock-up clutch 12.

FIG. 3 shows the control program for the lock-up clutch 12 executed by the control unit 20.

At step 61, based on an output signal of the shift position switch 23, the control unit 20 determines whether the shift position is in either N (neutral) or P (parking). If it is determined as No, i.e., the shift is not in N nor P, the control unit 20 is suspended until it is set in N or P position for executing the following control routine.

If it is determined as Yes at step 61, i.e., the shift is in N or P, the process proceeds to the next step 62. At step 62, it is determined whether the PTO unit 10 is operated or not based on the output signal of the PTO switch 21.

If it is determined as No at step 62, i.e., the PTO unit 10 is not operated, the process proceeds to step 66, where the lock-up clutch 12 is set at OFF to return to the initial step (Step 61). This is because the control unit 20 has no need to set the lock-up clutch 12 ON when the shift is set in N or P, and the PTO unit 10 is not operated.

If it is determined as Yes at step 62, i.e., the PTO unit 10 has been already operated, the process proceeds to step 63 where the output status of the engine 41 is checked. In this embodiment, the output status is determined by examining whether the output value n of the engine rotational sensor 22 (FIG. 1) in the engine 41 exceeds a predetermined value $N_0$ or not.

If it is determined as No at the step 63, i.e., the engine speed n is equal to or smaller than the predetermined value $N_0$, it is determined that little power is left in the engine 41 to the load. The process then proceeds to step 66 where the lock-up clutch 12 is set at OFF so as to keep the engine 41 from excessive load.

If it is determined as Yes at step 63, i.e., the engine speed n exceeds the value $N_0$, the process proceeds to step 64 where it is determined again whether the shift is in either N or P. If it is detemirned as Yes at step 64, the lock-up clutch 12 is set at ON at step 65.

While if it is determined as No at step 64, i.e., the shift position is not in N nor P (shift position has changed and running load has been applied), this is imcompatible with the condition at step 61, thus keeping the lock-up clutch 12 at OFF.

In the automatic transmission 1 of this embodiment, the lock-up clutch 12 is set at ON only when the running load is not applied (step 64) and sufficient power to the load remains in the engine (step 63).

Since the lock-up clutch 12 is set at ON only when the engine 41 has sufficient power to the load, the engine 41 can be kept from excessive load, thus improving the fuel consumption and preventing engine failure.

And the operation of the lock-up clutch serves to improve power transmission efficiency.

As described above, the present invention provides the automatic transmission system with a PTO unit which improves the fuel consumption and power transmission efficiency of the engine as well as keeping the engine from excessive load.

Embodiment 2

In this embodiment, step 610 is provided between steps 61 and 62 in the control flow of the Embodiment 1 (FIG. 3) for further enhancing controlling stability.

With the control flow shown in FIG. 3, when the lock-up clutch 12 is set at ON at step 65, the engine speed n becomes equal to or smaller than the predetermined value $N_0$. This is likely to cause the process to sequentially proceed to step 63, step 66, then return to step 61. Since the lock-up clutch 12 is set at OFF at step 66, the engine speed n exceeds the predetermined value $N_0$ at step 63 again. The process thus repeats the same path of the control routine of steps 61-65, 65-63, and 63-61 via 66, resulting in deteriorating controlling stability.

In this embodiment, step 610 is added to the control flow of the Embodiment 1, in which another predetermined value N2 at step 631 is set on the assumption that the engine speed n decreases upon setting the lock-up clutch at ON, thus further stabilizing the control flow.

At step 610, if it is determined that the engine speed n exceeds the predetermined value N1, the process proceeds to step 62. Then the predetermined value N2 at step 631 is set to the value smaller than the above predetermined value N1. The difference between values N1 and N2 (N1–N2) is so set to be larger than the decrease in the engine speed n, resulting from setting the lock-up clutch ON. Although the lock-up clutch 12 is set at ON at step 65, the control routine is stabilized to ensure that the process proceeds to steps 62 to 65, without returning to step 61 from step 66, resulting in anti-hunting effect in the control.

Other features are the same as those of Embodiment 1.

Embodiment 3

Figure 5:
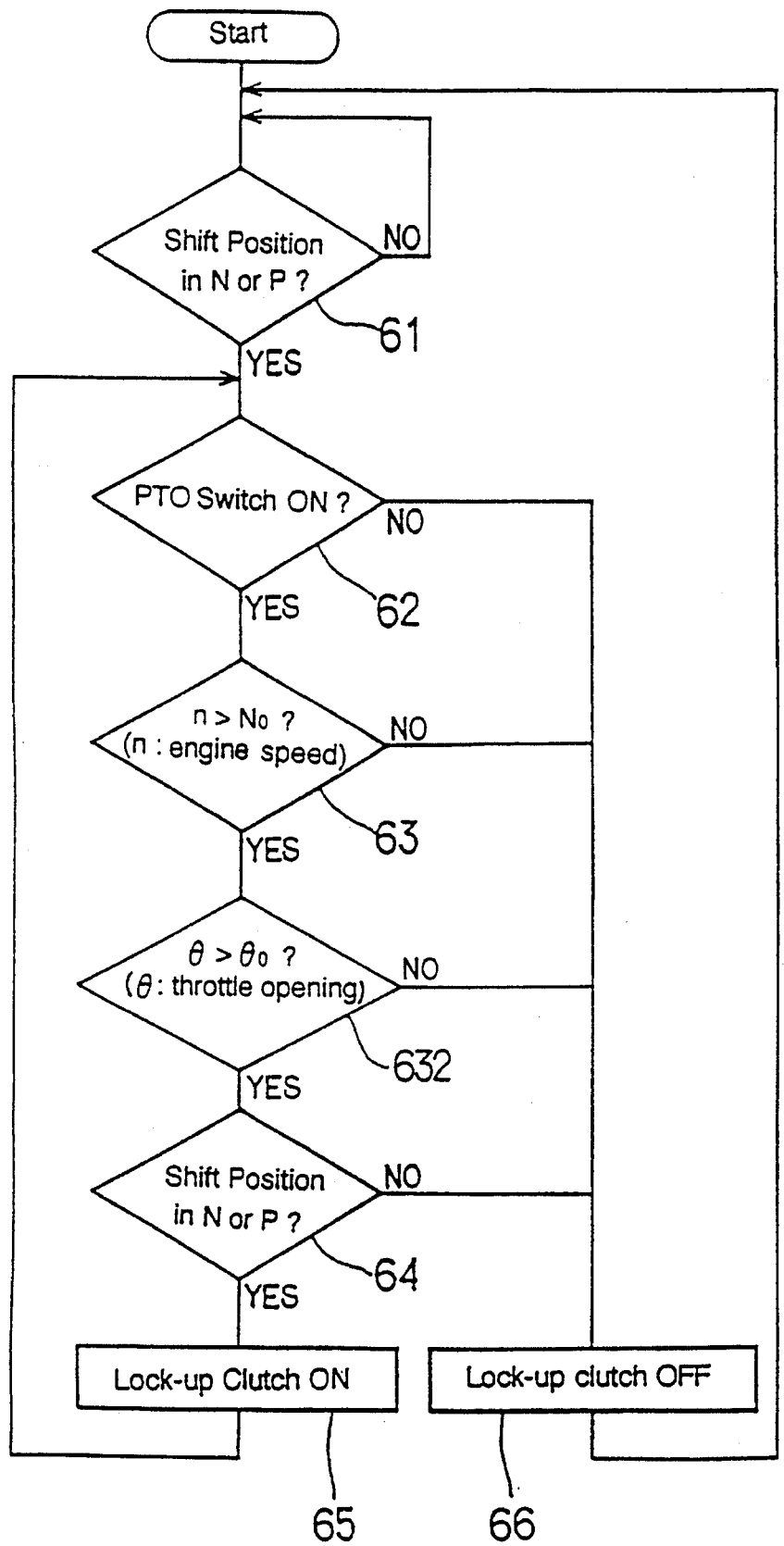
FIG. 5 is a flow chart for controlling the lock-up clutch in an automatic transmission system of a third embodiment.

In this embodiment, as shown in FIG. 5, step 632 is provided between steps 63 and 64 in the control flow of the Embodiment 1 (FIG. 3) for imposing another condition on the process to step 65.

Specifically, it is determined whether the engine speed n exceeds the predetermined value $n_0$ at step 63. If it is determind as Yes, the process proceeds to step 632. At step 632, it is determined whether the throttle opening value $\theta$ exceeds the predetermined value $\theta_0$. If it is determined as Yes, then the process proceeds to step 65. In other words, the lock-up clutch is set at ON only when it is determined as Yes at both steps 63 and 632.

The throttle opening value $\theta$ is determined by using a throttle sensor 24 (FIG. 1). Since the throttle opening value $\theta$ refers to the output status of the engine, it serves to clarify sufficient power retained in the engine to the load in the process to set the lock-up clutch 12 set at ON.

Other features are the same as those of Embodiment 1.

While the invention has been described with reference to embodiments, it is to be understood that modifications or variations may be easily made by a person of ordinary skill in the art without departing from the scope of the invention which is defined by the appended claims.

What is claimed is:

1. An automatic transmission system with a power take-off unit for taking off auxiliary power comprising:

a torque converter equipped with a lock-up clutch; and a control unit for setting said lock-up clutch ON and OFF which serves to set said lock-up clutch ON only when an engine output is determined to be higher than a predetermined level, and a transmission shift lever is set in either a neutral or a parking position with said power take-off unit set at ON.

2. An automatic transmission system with a power take-off unit as in claim 1, wherein said control unit serves to determine the engine output based on the value of an engine throttle opening and an engine speed.

* * * * *